United States Patent
Zabel

[19]

[11] Patent Number: 6,088,951
[45] Date of Patent: Jul. 18, 2000

[54] COUPLING SYSTEM FOR TWIN-FIN TUBES USED IN RADIATION HEATING APPLICATIONS

[76] Inventor: Russell A Zabel, 13585 Esprit Ave., San Diego, Calif. 92128

[21] Appl. No.: 08/940,109

[22] Filed: Sep. 29, 1997

[51] Int. Cl.[7] .................................................... A01G 13/06
[52] U.S. Cl. ............................................. 47/1.01; 47/48.5
[58] Field of Search .................................. 47/48.5, 1.01; 165/45; 126/658, 670

[56] References Cited

U.S. PATENT DOCUMENTS

| | | | |
|---|---|---|---|
| 1,604,189 | 10/1926 | Nelson | 47/1.01 |
| 3,579,908 | 5/1971 | Morgan | 47/48.5 X |
| 4,870,781 | 10/1989 | Jones | 47/48.5 X |
| 5,263,278 | 11/1993 | Valenti, Jr. | 47/48.5 |

Primary Examiner—Robert P. Swiatek
Attorney, Agent, or Firm—Charles C. Logan, II

[57] ABSTRACT

A coupling system for twin-fin tubes used in radiation heating for agricultural applications wherein a heated fluid, such as water, is passed through the tubes for the purpose of heating surrounding plants. The twin-fin tubes have a tubular portion from which twin-fins protrude radially. The twin-fins also extend substantially the entire length of the tubular portion. Adjacent each end of the twin-fin tubes, the tubular portion has a neck segment with a pair of radially outwardly extending fingers. The tubular coupler has an inside diameter slightly larger than the diameter of the neck portion which is removably inserted therein. Adjacent each end of the tubular coupler are a pair of axially spaced annular grooves on the inner surface thereof. The inner most of these two annular grooves has an O-ring seated therein. Axially extending slots extend in from the respective left and right ends of the coupler to the outer most inner annular grooves and function to receive the radially extending fingers on the respective neck segments of the respective twin-fin tubes. A slight radial rotation motion to the coupler locks the respective members of the assembly together.

7 Claims, 1 Drawing Sheet

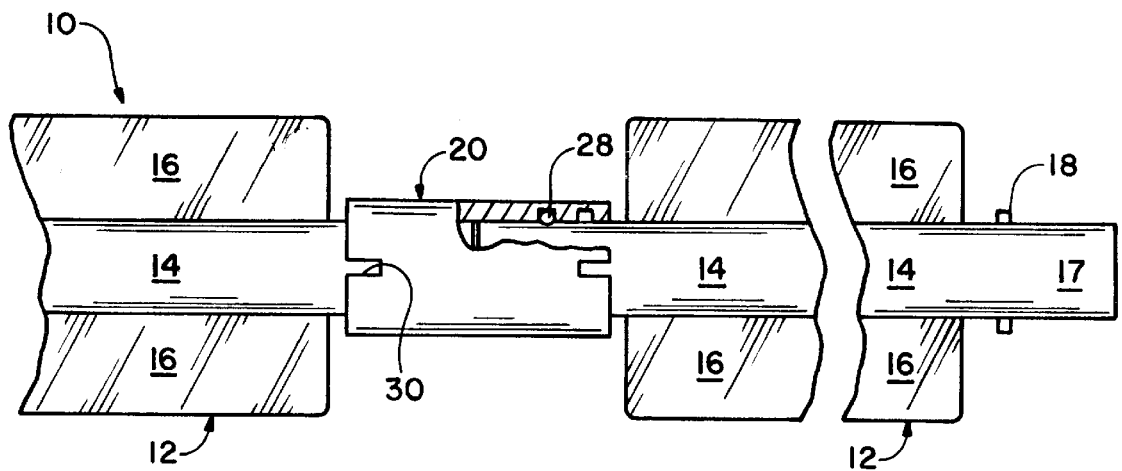
FIGURE 1
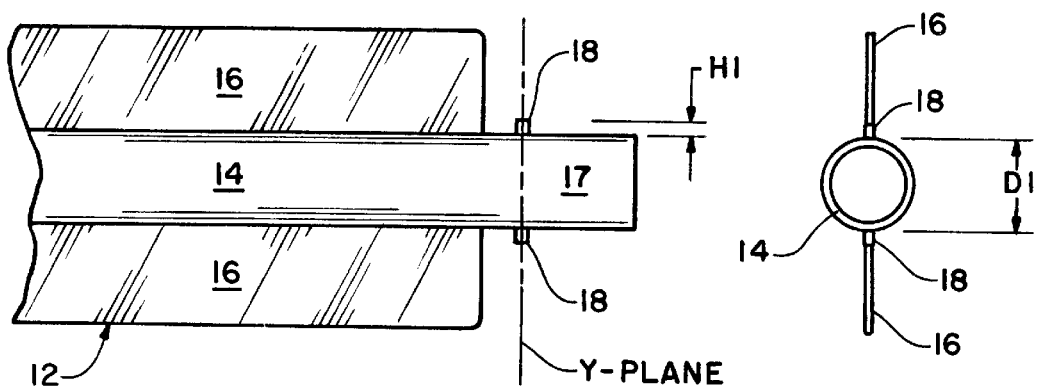
FIGURE 2                FIGURE 3
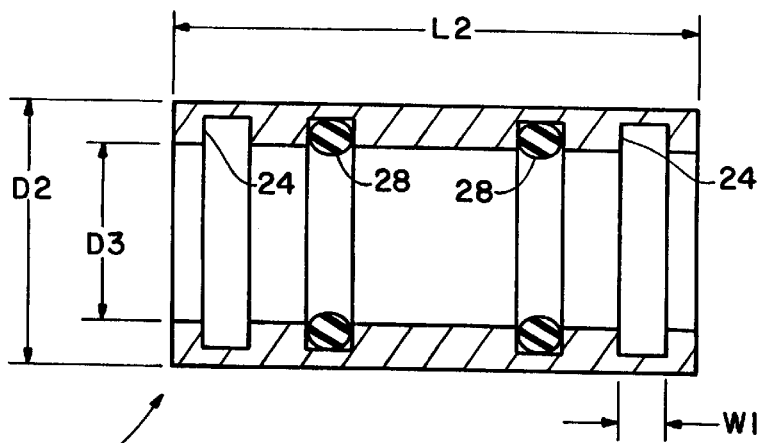 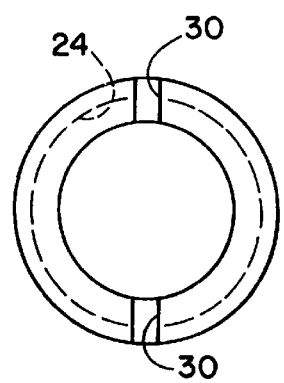
FIGURE 4                FIGURE 5

COUPLING SYSTEM FOR TWIN-FIN TUBES USED IN RADIATION HEATING APPLICATIONS

BACKGROUND OF THE INVENTION

The invention relates to a coupling system and more specifically to one that would be used with twin-fin tubes such as used in radiation heating for agricultural applications wherein a heated fluid, such as water, is passed through the tubes for the purpose of heating surrounding plants.

In greenhouse agricultural applications it has been found desirable to use radiation heating for the heating requirements of the greenhouse. These hot water heating systems utilize the physics of heat to efficiently heat the plants. Putting the heat under the plants allows the heat source to react faster to temperature changes at the plant level. Heating from below offers a more constant temperature, better plant quality and lower heating costs.

The radiation heating systems require a large number of elongated twin-fin tubes that are interconnected together in series. The twin-fin tubes normally come in standard 20 foot lengths. Present day couplings have not been entirely satisfactory and require excessive time to assemble them which is undesirable. It is an object of the invention to provide a novel coupling system that uses a special coupler that requires no threading.

It is also an object of the invention to provide a novel coupling system whose unique fittings make it easy to install.

It is another object of the invention to provide a novel coupling system that is easy to maintain or replace parts.

It is an additional object of the invention to provide a novel coupling system that is economical to manufacture and market.

SUMMARY OF THE INVENTION

The novel coupling system is utilized to connect in series pairs of twin-fin tubes. The tubular coupler itself has unique structure that has been designed to mate with specific structure that has been formed on the ends of each of the twin-fin tubes.

The twin-fin tubes are normally formed of aluminum by an extrusion manufacturing process. The fin portions have their front and rear ends extending longitudinally between the front and rear ends of the twin-fin tubes. By machining part of the fin portion away and forming radially extending fingers, a mating structure is prepared for coupling with the tubular coupler.

The tubular coupler has an inner diameter slightly larger than the outer diameter of the tube portion of the twin-fin tubes. The interior of the tubular coupler has a pair of axially spaced annular inner grooves adjacent each end. The inner most grooves receive an O-ring that provides a water tight seal with the neck segment of the twin-fin tube that is inserted therein. Axial slots extend in from the respective ends of the tubular coupler into communication with the outer most annular grooves. This allows the fingers that have been formed on the neck segment of the tubular fin tubes to be telescopically inserted into the ends of the tubular coupler, after which the tubular coupler is radially rotated to secure the respective members together.

DESCRIPTION OF THE DRAWINGS

FIG. 1 is a top plan view illustrating the coupling system with portions of the tubular coupler broken away for clarity;

FIG. 2 is a top plan view of a portion of one of the twin-fin tubes;

FIG. 3 is an end elevation view of one of the twin-fin tubes;

FIG. 4 is a vertical cross sectional view of the tubular coupler; and

FIG. 5 is an end elevation view of the tubular coupler.

DESCRIPTION OF THE PREFERRED EMBODIMENT

The novel coupling system for twin-fin tubes used for radiation heating in agricultural applications wherein a heated fluid, such as water, is passed through the tubes for the purpose of heating surrounding plants will now be described by referring to FIGS. 1–5 of the drawings.

The coupling system is generally designated numeral 10. It has a pair of twin-fin tubes 12 that are normally in the range of 20 feet long. Each twin-fin tube has a tubular portion 14 and a pair of radially extending fin portions 16. Adjacent each end of the twin-fin tube 12 is a neck portion 17 having an outer diameter D1. A pair of radially extending fingers 18 lie in a transversely extending Y-plane.

A tubular coupler 20 has a length L2 in the range of 1.25–6 inches. The tubular coupler has a outer diameter D2 in the range of 0.75–2.0 inches. Its inner diameter D3 is slightly larger than the outer diameter D1 of neck portion 17. Tubular coupler 20 has a cylindrical inner surface having a pair of annular grooves 24 and 26 formed adjacent each of its ends. O-rings 28 are received in the respective annular grooves 26 and form a water tight seal with neck segment 17 when it is inserted into tubular coupler 20. Axial slots 30 connect with the respective annular grooves 24 and provide a passage for fingers 18 as tubular coupler 20 receives neck portion 17. Once the fingers 18 reach the respective annular grooves 24 a radial rotation is given to tubular coupler 20 to lock the coupler onto the ends of the respective twin-fin tubes.

Fingers 18 have a height H1 and H1 is in the range of 1/16–1/4 inch. The width of the fingers 18 is slightly less than the width W1 of the annular grooves 24.

Twin-fin tubes 18 are preferably made of extruded material such as aluminum. The fin portions 16 adjacent each end of the twin-fin tubes would be machined away to form the neck portion 17 and its respective radially extending fingers 18.

What is claimed is:

1. A coupling system for twin-fin tubes used in radiation heating for agricultural applications wherein a heated fluid, such as water, is passed through said tubes for the purpose of heating surrounding plants, said coupling system comprising:

a first elongated twin fin tube having a length L1, a tubular portion and at least two fin portions; said tubular portion having an outer surface and said fin portions are connected to said outer surface; said tubular portion having at least one neck segment extending from one end of said first twin fin tube; said at least one neck segment having an outer surface, an outer diameter D1 and a plurality of transversely extending fingers having a height H1 protruding from said outer surface of said at least one neck segment;

a second elongated twin fin tube having a length L1, a tubular portion and at least two fin portions; said tubular portion having an outer surface and said fin portions are connected to said outer surface; said tubular portion having at least one neck segment extending from one end of said second twin fin tube; said at least one neck segment having an outer surface, an outer diameter D1 and a plurality of transversely extending fingers having a height H1 protruding from said outer surface of said neck segment;

an elongated tubular coupler having a left end and a right end, a length L2, an outer diameter D2, an inner diameter D3 and D3 is greater than D1 so that the neck segments of said respective first and second twin fin tubes can be telescopically received in said respective left and right ends of said tubular coupler; said tubular coupler having a cylindrical inner surface and first and second longitudinally spaced annular grooves are formed in said cylindrical surface adjacent said left end and third and fourth longitudinally spaced annular grooves are formed in said cylindrical surface adjacent said right end; O-rings are captured in said second and fourth annular grooves; a plurality of axial slots are formed in said left and right ends of said tubular coupler and they connect to said respective first and third annular grooves;

said neck segments of said respective twin thin tubes are removably received in said respective left and right ends of said tubular coupler with their respective outwardly extending fingers aligning with said respective axial slots; during assembly said neck segments are inserted into the respective left and right ends of said tubular coupler until their respective radially extending fingers register in said respective first and third inner annular grooves after which said coupler can be twisted radially to lock said neck segments therein in a fluid tight connection.

2. A coupling system for twin-fin tubes as recited in claim 1 wherein L1 is in the range of 4–30 feet.

3. A coupling system for twin-fin tubes as recited in claim 1 wherein L2 is in the range of 1.25–6 inches.

4. A coupling system for twin-fin tubes as recited in claim 1 wherein B1 is in the range of 0.75–2.0 inches.

5. A coupling system for twin-fin tubes as recited in claim 1 wherein said tubular and said fin portions are integrally formed of extruded material.

6. A coupling system for twin-fin tubes as recited in claim 1 wherein said material is aluminum.

7. A coupling system for twin-fin tubes as recited in claim 1 wherein H1 is in the range of 1/16–1/4 inch.

\* \* \* \* \*